(No Model.)

G. S. CROSBY.
TOY.

No. 330,297. Patented Nov. 10, 1885.

Witnesses
S. Williamson
W. T. Haviland

Inventor
George S. Crosby
By Smith & Hubbard
Atty's.

UNITED STATES PATENT OFFICE.

GEORGE S. CROSBY, OF BRIDGEPORT, CONNECTICUT.

TOY.

SPECIFICATION forming part of Letters Patent No. 330,297, dated November 10, 1885.

Application filed October 20, 1884. Serial No. 146,042. (No model.)

*To all whom it may concern:*

Be it known that I, GEORGE S. CROSBY, a citizen of the United States, residing at Bridgeport, in the county of Fairfield and State of Connecticut, have invented certain new and useful Improvements in Toys; and I do hereby declare the following to be a full, clear, and exact description of the invention, such as will enable others skilled in the art to which it appertains to make and use the same.

My invention relates to certain novel and useful improvements in toys, but more especially in toy vehicles and horses, and has for its object to provide a simple and economical device of this description, and, furthermore, to greatly simplify the manner of attaching the horse to the vehicle; and with these ends in view my invention consists in the details of construction and combination of elements hereinafter described, and then set forth in the claims.

In order that those skilled in the art to which my invention appertains may more fully understand its construction and operation, I will proceed to describe the same in detail, referring by letter to the accompanying drawings, forming a part of this specification, in which—

Figure 1:
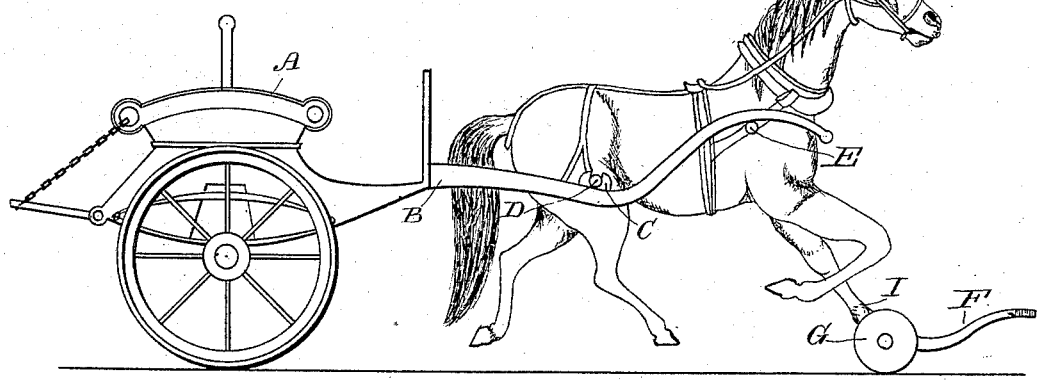
Figure 2:
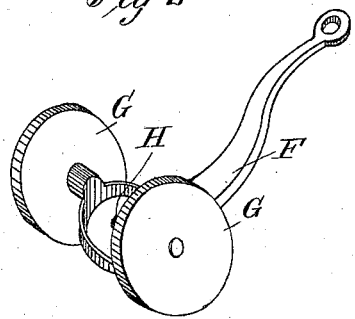
Figure 3:
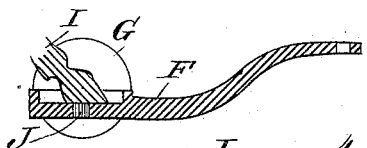

Figure 1 shows a side elevation of my improvement; Fig. 2, a detail perspective view of the pivoted truck; and Fig. 3 a central vertical section taken through the truck and the hoof resting thereon.

Similar letters denote like parts in the several figures.

A is any ordinary cart, and B the shafts. The latter have U-shaped lugs C, formed integral therewith and projecting upward therefrom. From each side of the horse, near the flanks, is a pin projection, D, adapted to seat within the lugs C. These pins may be cast integral with the horse, or they may be driven within holes in the latter. Near the shoulders of the horse project similar pins, E, which are adapted to extend underneath the forward extremities of the shafts and abut against the same, thereby keeping the pins D in their position within the lugs C.

F is a truck, provided with wheels G at the sides, and with a perforation, H, at the central portion. One of the forward hoofs I of the horse is provided with a projection, J, adapted to enter said perforation, as clearly shown at Fig. 3.

It will thus be seen that the device has three points of support, none of which offers any material frictional opposition to the ready movement of the device in any direction; also, the horse may be readily attached to and detached from the shafts.

Having thus described my invention, what I desire to secure by Letters Patent, is—

1. In a toy horse and vehicle, the horse suspended from the shafts and with one of the front hoofs swiveled to a rolling truck, substantially as shown and described.

2. The horse having pin projections D E, in combination with the shafts having U-shaped lugs C, substantially as set forth.

3. In a toy horse and vehicle, one of the front hoofs of the horse having a downward projection, and adapted to extend within a perforation in a rolling truck, substantially as shown and set forth.

4. The combination of the horse provided with lateral pin projections D E, and with projection extending downward from one of the front hoofs, with the shafts provided with U-shaped lugs and the rolling truck having central perforation, substantially as shown and described.

In testimony whereof I affix my signature in presence of two witnesses.

GEORGE S. CROSBY.

Witnesses:
S. S. WILLIAMSON,
W. T. HAVILAND.